United States Patent [19]

Parker et al.

[11] 4,197,453
[45] Apr. 8, 1980

[54] OPTICAL PATTERN TRACER

[75] Inventors: Robert E. Parker, Dundas; William Dell, Hamilton, both of Canada

[73] Assignee: Westinghouse Canada Limited, Hamilton, Canada

[21] Appl. No.: 897,178

[22] Filed: Apr. 17, 1978

[30] Foreign Application Priority Data

Nov. 21, 1977 [CA] Canada .................................. 291304

[51] Int. Cl.² .............................................. G05B 1/00
[52] U.S. Cl. ................................... 250/202; 318/577
[58] Field of Search .............. 250/201, 202, 234, 235, 250/236; 318/577

[56] References Cited

U.S. PATENT DOCUMENTS

| 3,995,154 | 11/1976 | Schlick et al. | 318/577 |
| 4,117,324 | 9/1978 | Francke | 250/202 |
| 4,128,481 | 12/1978 | Schreyer | 318/577 |

Primary Examiner—David C. Nelms
Attorney, Agent, or Firm—Robert H. Fox; Edward H. Oldham

[57] ABSTRACT

A pattern tracer having provision for recognizing special markings on the pattern termed "command marks" and for recognizing at least two different kinds of commands to enable special control of the machine tool controlled by the pattern tracer.

3 Claims, 3 Drawing Figures

OPTICAL PATTERN TRACER

BACKGROUND OF THE INVENTION

This invention relates to optical pattern tracing controls and in particular, to controls of the type which repetitively scan the pattern to be followed in a circular manner, derive a signal from said scanning operation and utilize the signal to control coordinate drive motors, which position a machine tool.

There are various types of optical pattern tracing machine control systems including scanning and non-scanning tracing heads, friction and coordinate drive machines, edge and line tracers. This invention has particular application to a pattern tracer of the circular scanning type for operation with a coordinate drive system which may be used for line tracing. By a circular scanning tracer, it is meant a tracer which views the pattern in such a manner that the point observed by the tracing head is caused to rotate repetitively so as to describe a circular path on the surface bearing the pattern when the head is stationary. Naturally, when the head is in translational motion, the point scanned by the tracing head will more closely approach an epicycle. The detector in the tracing head is arranged to produce a signal indicative of a change of illumination of the detector. The signal representing this transition is then processed and used to control a pair of motors, which when associated with the suitable machinery, will cause the tracing head and related machine tool to move in a plane in accordance with the pattern as controlled by the motors.

It will be appreciated that when, in accordance with general practise in this field, the convolutions performed by the tracing head are similarly performed by the machine tool, which may, for example, be a cutting torch, the material to be cut will be shaped into the same form as the pattern being traced by the tracing head.

In circular scanning tracing heads, it is necessary to correlate the signal produced by the scanning head with information indicating the instantaneous direction of the scanning point. In the prior art, this reference information has been generated as sinusoidal information, as for example, in the tracing head described in Canadian Pat. No. 917,773 issued Dec. 26, 1972 in the names of Robert E. Parker, et al. In order to permit the machine to continue operating in a particular direction in the absence of a line to prevent inadvertent reversal in the presence of unintended breaks in the line or in the presence of intentional breaks which are required for other purposes, it has been a practise to incorporate a memory circuit such as that described in Canadian Pat. No. 950,553 issued July 2, 1974 in the names of William Dell, et al, or in Canadian Pat. No. 1,005,549 issued Feb. 15, 1977 in the names of Francis P. Murphy, et al. It will be assumed that the system operates in accordance with these latter systems as described in the aforementioned patents and that the system has been arranged to respond to command marks as described in Canadian Pat. No. 1,005,549 and in accordance with Canadian Pat. No. 950,553.

In accordance with the previous patents, when the system encountered a command mark, it would step the program on to the next step causing certain controlled functions to occur. However, the program was stored in a matrix type of memory which required a separate step for each function irrespective of whether the functions were repetitive. In situations where a number of corners are encountered, it is necessary in some circumstances to reduce the speed of the system when negotiating each such a corner. The essentially repetitive nature of this function indicates it would be preferable not to store it as a repeated function in the program matrix.

SUMMARY OF THE INVENTION

In accordance with the present invention, an alternate form of command mark is used, which command mark does not affect the ordinary command mark circuit. These special command marks and the output produced from them may therefore be utilized to control a completely auxiliary operation, such as slowdown, which will occur on the detection of everyone of such special command marks. In addition, it will be possible to produce special outputs in the presence of both types of command marks which may have special value in eliminating inadvertent commands caused by flaws in the pattern.

BRIEF DESCRIPTION OF THE DRAWINGS

A clearer understanding of our invention may be had from a consideration of the following description of a preferred embodiment, together with the associated drawings, in which.

Figure 1:
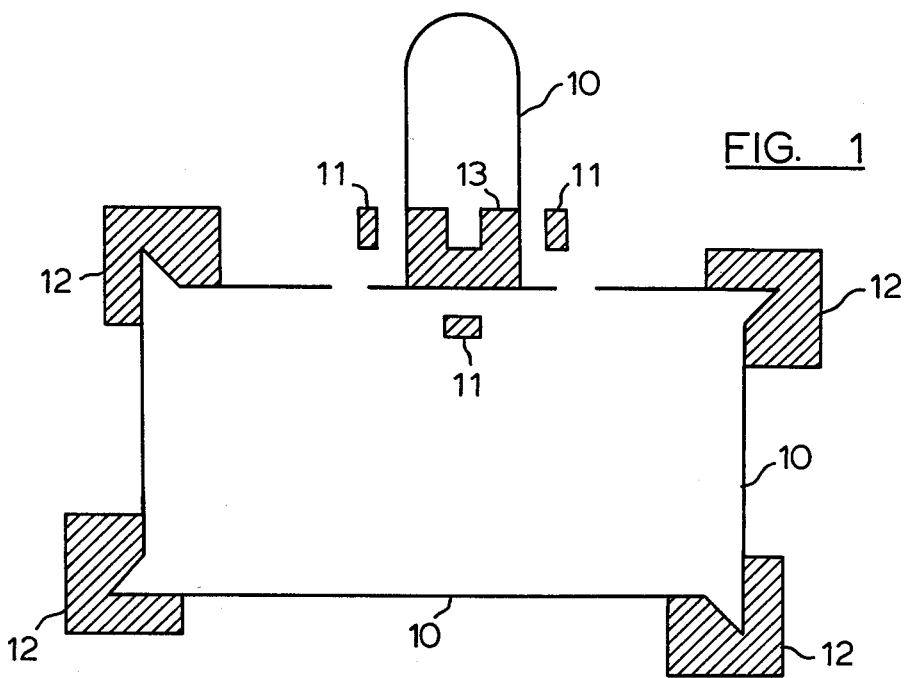
FIG. 1 is an illustration of a pattern incorporating both normal command marks and the special auxiliary command marks.

Considering FIG. 1, it will be seen that the pattern consists of a line 10 with command marks 11 corresponding to the marks described in the preceding patents and command marks 13 which do not initiate a sequential selection of an auxiliary operation, but instead, repetitively introduce a slowdown operation as long as the speed control command mark is present and detected. Command marks 12 are composite marks which compensate for the lead of the scanner and cause the corner to be a right angle, rather than rounding off the corner at a radius whose function is related to the lead of the system and also introduce slowdown operation.

Figure 1A:
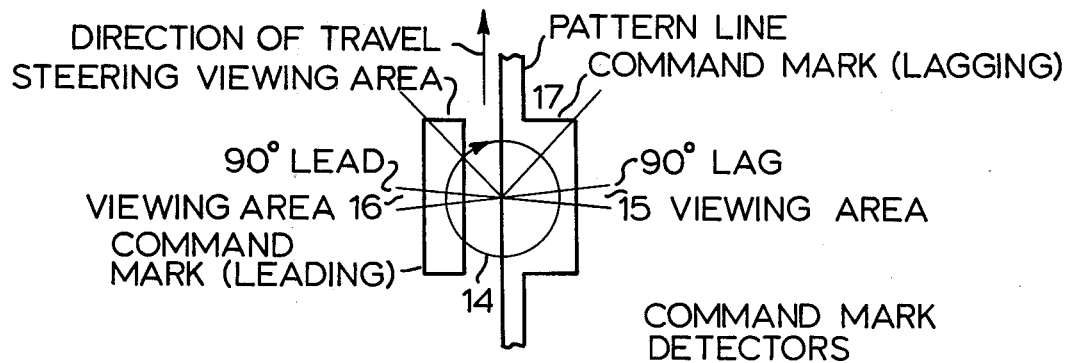
FIG. 1a is an enlarged drawing of a portion of such a pattern and an illustration of the viewing pattern of the scanner superposed thereon.

Considering now FIG. 1a, it will be seen that the circular pattern scanned by the tracer is shown as circle 14. The signals in the forward sector of this circle designated 17 control the direction of travel under most conditions. Signals outside of this forward looking sector, or steering viewing area, as it may be termed, do not affect the steering of the machine. A narrow sector 16 produces normal command mark signals in the presence of a command mark at 90° to the direction of the travel, 90° ahead of the normal directional signal. In the narrow segment designated 15, at approximately 90° to the direction of travel are speed control command mark signals. The command mark merely constitutes an enlargement of the pattern in this area, although it may be any other suitable mark which will be encountered by the scanning circle for a sufficient number of times to generate a command signal. This signal is used for auxiliary controls such as speed control.

Figure 2:
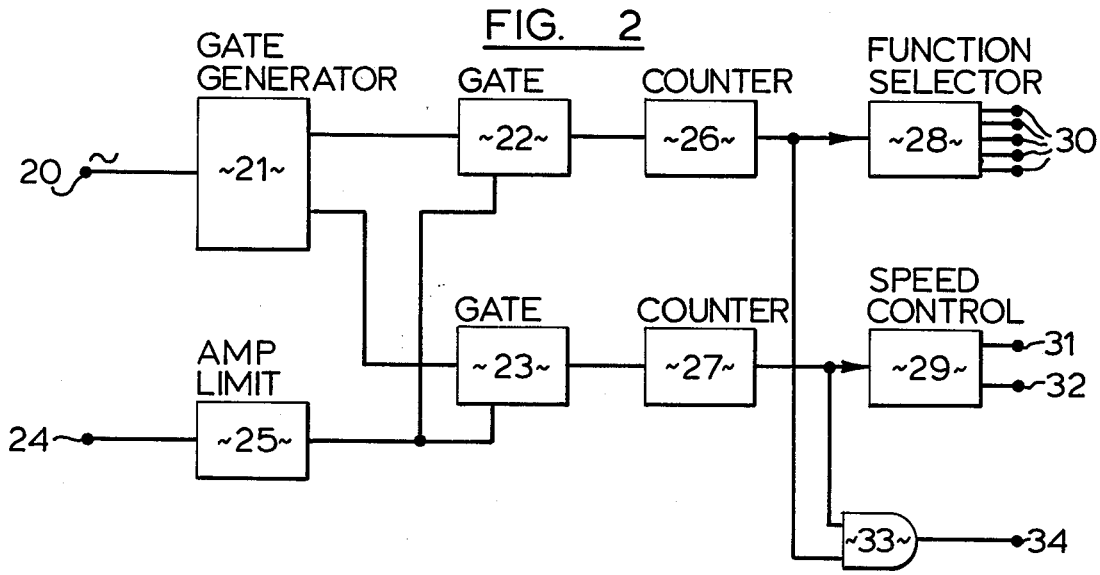
FIG. 2 is a block diagram of a portion of the system incorporating our invention.

Considering now FIG. 2, it will be seen that the sinusoidal directional signal indicating the orientation of the line with respect to the head is applied through terminal 20 to gate generator 21. The gate generator produces two gate signals, one gate signal is produced on the positive to negative zero crossing and the other on the negative to positive zero crossing of the sinusoid. These two gate signals are applied to gates 22 and 23 respectively. The signal from the detector is applied to terminal 24 of amplifier limiter 25 when a mark or line is present. An output is produced from the amplifier limiter 25 and applied to gates 22 and 23. The presence of a command mark at 90° to the direction of tracing either in lagging or advance will produce a signal which is applied to gates 22 and 23. The outputs from gates 22 and 23 are applied to counters 26 and 27 respectively. The output from counter 26 is applied to function selector 28, which energizes terminals 30 sequentially, causing the various functions to be performed by the machine tool in accordance with a predetermined program. The output from counter 27 on the other hand, is applied to speed control 29 which produces an output, either on the high or low terminal 31 or 32, causing the machine to operate either at high speed or low speed, depending upon the condition of the speed control.

In operation, the gate generator 21 produces a gate signal which is applied to gates 22 and 23. Gate 22 being opened for example, on the negative to positive zero crossing of the sine wave, thus permitting signals which occur 90° leading the direction signal to be gated through gate 22 and applied to counter 26. Counter 26 produces an output after a predetermined number of pulses have been received, two for example, and continues to produce an output as long as pulses continue to be applied. The occurrence of the output from counter 26 steps the function selector on one more step, thus energizing the next terminal 30 in sequence and producing the next event in the program, which may for example, be preheat, pierce oxygen flow, etc., depending on what sort of machine tool is being controlled. If, on the other hand, a mark is encountered in the 90° lagging position with respect to the directional pulse, the gate produced during the positive to negative going zero crossing will switch on gate 23 producing a pulse which is applied to counter 27. When a sufficient number of these pulses are accumulated in counter 27, an output is applied to the speed control 29 causing the speed to be reduced from high to low, that is, an output is produced on terminal 32 instead of on terminal 31. In the absence of such signals, terminal 31 is energized causing the machine to operate at high speed. As long as the auxiliary command signal is received, the speed control remains in its low condition. As soon as the auxiliary command signal is no longer encountered, the speed returns to its normal high speed.

In addition to both of the foregoing functions, a further function is possible by combining the outputs of counters 26 and 27 in AND circuit 33. The output from AND circuit 33 will occur only when signals are present from both counters 26 and 27. This provision is of particular advantage in situations where inadvertent actuation of some function would be extremely dangerous or destructive of the machinery or the material being processed. The necessity for coincidence of command marks on both sides of the pattern avoids inadvertent counting of spots, marks or other flaws on the paper. Alternatively, one of the outputs from the function selector 28 could be applied to the AND circuit 33. In this way, a series of functions could be performed irrespective of the presence of the speed control signal, but when a particular function was selected and the speed control signal occurred at the same time, an output would be produced on terminal 34 of AND circuit 33.

It will be understood that the particular arrangement described may be varied to provide controls, other than speed controls and the specific functions described, particularly with reference to the block diagram, may be augmented or provided in other means.

The embodiments of the invention in which an exclusive property or privilege is claimed are defined as follows:

1. In a circular scanning optical pattern tracing system for tracing a pattern including auxiliary marks adjacent a guidance pattern, scanner means to scan said pattern in a circular manner about a center and produce signals in response to changes in the optical characteristic of the pattern encountered by said scanner at different bearings relative to said center, means to select certain of said signals generated in response to said guidance pattern encountered at bearings within a selected angle generally in the direction of travel of said scanner and to utilize said signals so selected as guidance signals to guide said center in its travel along said guidance pattern, means to select other of said signals generated only in response to said auxiliary marks encountered at bearings substantially perpendicular to the direction of travel of said scanner and to utilize said other selected signals as auxiliary signals to control the operation of said tracing system including associated equipment.

2. In a circular scanning optical pattern tracing system as claimed in claim 1 wherein the pattern is a line, means to combine the auxiliary signals produced by auxiliary marks on one side of the line with auxiliary signals produced by marks on the other side of the line to produce a further auxiliary signal.

3. In a circular scanning optical pattern tracing system as claimed in claim 1 wherein the pattern is a line, means to sequentially select one of a series of predetermined control function in response to the production of each auxiliary signal produced in response to auxiliary marks on one side of the line and means to repetitively produce a single predetermined control function in response to the production of each auxiliary signal produced in response to auxiliary marks on the other side of the line.

* * * * *